United States Patent
Mussa et al.

(10) Patent No.: US 12,077,165 B2
(45) Date of Patent: Sep. 3, 2024

(54) REAL-TIME DRIVER ANALYSIS AND NOTIFICATION SYSTEM

(71) Applicant: Allstate Insurance Company, Northbrook, IL (US)

(72) Inventors: Joseph Mussa, Northbrook, IL (US); Kelsy Ecclesiastre, Northbrook, IL (US); Judah Tucker, Northbrook, IL (US); Madison Kuhler, Northbrook, IL (US); Raymone Byrd, Northbrook, IL (US); Mallika Patil, Northbrook, IL (US)

(73) Assignee: ALLSTATE INSURANCE COMPANY, Northbrook, IL (US)

(*) Notice: Subject to any disclaimer, the term of this patent is extended or adjusted under 35 U.S.C. 154(b) by 0 days.

(21) Appl. No.: 17/878,513

(22) Filed: Aug. 1, 2022

(65) Prior Publication Data
US 2023/0036776 A1 Feb. 2, 2023

Related U.S. Application Data

(60) Provisional application No. 63/228,290, filed on Aug. 2, 2021.

(51) Int. Cl.
*B60W 40/08* (2012.01)
*B60W 50/14* (2020.01)
*B60W 60/00* (2020.01)
*G06V 20/59* (2022.01)

(52) U.S. Cl.
CPC ............ *B60W 40/08* (2013.01); *B60W 50/14* (2013.01); *B60W 60/0051* (2020.02); *G06V 20/597* (2022.01); *B60W 2050/146* (2013.01); *B60W 2540/225* (2020.02); *B60W 2540/227* (2020.02); *B60W 2540/229* (2020.02); *B60W 2540/26* (2013.01)

(58) Field of Classification Search
CPC .. B60W 40/08; B60W 50/14; B60W 60/0051; B60W 2050/146; B60W 2540/225; B60W 2540/227; B60W 2540/229; B60W 2540/26; G06V 20/597
See application file for complete search history.

(56) References Cited

U.S. PATENT DOCUMENTS

| | | | |
|---|---|---|---|
| 10,207,635 B1 * | 2/2019 | Sanchez | B60Q 1/44 |
| 10,407,079 B1 * | 9/2019 | Chan | G06V 20/597 |
| 10,836,309 B1 * | 11/2020 | Trundle | G08G 1/0116 |
| 2016/0187879 A1 * | 6/2016 | Mere | B60W 50/082 701/23 |
| 2016/0267335 A1 * | 9/2016 | Hampiholi | B60K 28/06 |
| 2017/0297586 A1 * | 10/2017 | Li | G05D 1/0088 |
| 2018/0129202 A1 * | 5/2018 | Guo | B60W 40/08 |
| 2019/0027032 A1 * | 1/2019 | Arunachalam | G08G 1/0965 |
| 2020/0239007 A1 * | 7/2020 | Sobhany | B60W 50/14 |

* cited by examiner

Primary Examiner — Mohamed Barakat
(74) Attorney, Agent, or Firm — DINSMORE & SHOHL LLP

(57) ABSTRACT

Systems and methods are disclosed for determining a distraction level of a driver. A real-time driver analysis computer may receive sensor data from one or more driver analysis sensors. The real-time driver analysis computer may analyze the sensor data to determine a distraction level of a driver. Based on the distraction level, the real-time driver analysis computer may send one or more control signal to the vehicle and output one or more alerts to a mobile device associated with the driver.

18 Claims, 4 Drawing Sheets

REAL-TIME DRIVER ANALYSIS AND NOTIFICATION SYSTEM

CROSS-REFERENCE TO RELATED APPLICATION

This application claims priority to U.S. Provisional Application No. 63/228,290 filed Aug. 2, 2021, which is incorporated herein by reference in its entirety.

TECHNICAL FIELD

Aspects of the disclosure generally relate to the analysis of real-time driver data of a vehicle. In particular, various aspects of the disclosure relate to receiving real-time sensor data, analyzing the sensor data, and triggering distracted driving actions based on the analysis.

BACKGROUND

Many vehicles include sensors and internal computer systems designed to monitor vehicle operations, driving conditions, and driving functions. But by tracking only vehicle-based data, these systems may only detect dangerous driving after it has already occurred. In order to improve vehicular safety, it may be advantageous to monitor the driver so that dangerous conditions can be detected earlier.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods and computer devices for determining a distraction level of a driver. In one embodiment, a driver analysis computing device may include a processor and a memory unit communicatively coupled to the processor and storing machine-readable instructions. When executed by the processor, the machine-readable instructions may cause the processor to receive driver sensor data from one or more driver sensors. The driver sensor data may be captured by the one or more driver sensors while a driver is driving a vehicle. The one or more driver sensors may monitor and record a plurality of conditions of the driver. The plurality of conditions may include at least movement of a body of the driver, movement of eyes of the driver, or combinations thereof. The processor may analyze the driver sensor data to determine a distraction level of the driver. The processor may compare the distraction level to a threshold. The processor may determine, when the distraction level is above the threshold, that the driver is distracted. Responsive to a determination that the driver is distracted, the processor may output, to a graphical user interface of a mobile computing device of the driver, one or more graphical warnings. Responsive to the determination that the driver is distracted, output, to a vehicle control computer of the vehicle, one or more control signals to the vehicle.

In another embodiment, a computer-implemented method may include receiving driver sensor data from one or more driver sensors. The driver sensor data may be captured by the one or more driver sensors while a driver is driving a vehicle. The one or more driver sensors may monitor and record a plurality of conditions of the driver including movement of a body of the driver, movement of eyes of the driver, or combinations thereof. The method may further include analyzing the driver sensor data to determine a distraction level of the driver. The method may further include determining, when the distraction level is above the threshold, that the driver is distracted. The method may further include, responsive to a determination that the driver is distracted, outputting, to a graphical user interface of a mobile computing device of the driver, one or more graphical warnings. The method may further include, responsive to the determination that the driver is distracted, outputting, to a vehicle control computer of the vehicle, one or more control signals to the vehicle.

In another embodiment, a computer-implemented method may include receiving vehicle sensor data from one or more vehicle sensors indicative of operation of the vehicle. The method may further include receiving driver sensor data from one or more driver sensors. The driver sensor data may be captured by the one or more driver sensors while a driver is driving a vehicle. The one or more driver sensors may monitor and record a plurality of conditions of the driver include at least movement of a body of the driver, movement of eyes of the driver, or combinations thereof. The method may further include analyzing the driver sensor data and the vehicle sensor data to determine a distraction level of the driver in real-time. The method may further include comparing the distraction level to a threshold. The method may further include determining, when the distraction level is above the threshold, that the driver is distracted. The method may further include, responsive to a determination that the driver is distracted, outputting, to a graphical user interface of a mobile computing device of the driver, one or more graphical warnings. The method may further include, responsive to the determination that the driver is distracted, outputting, to a vehicle control computer of the vehicle, one or more control signals to the vehicle.

Other features and advantages of the disclosure will be apparent from the additional description provided herein.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
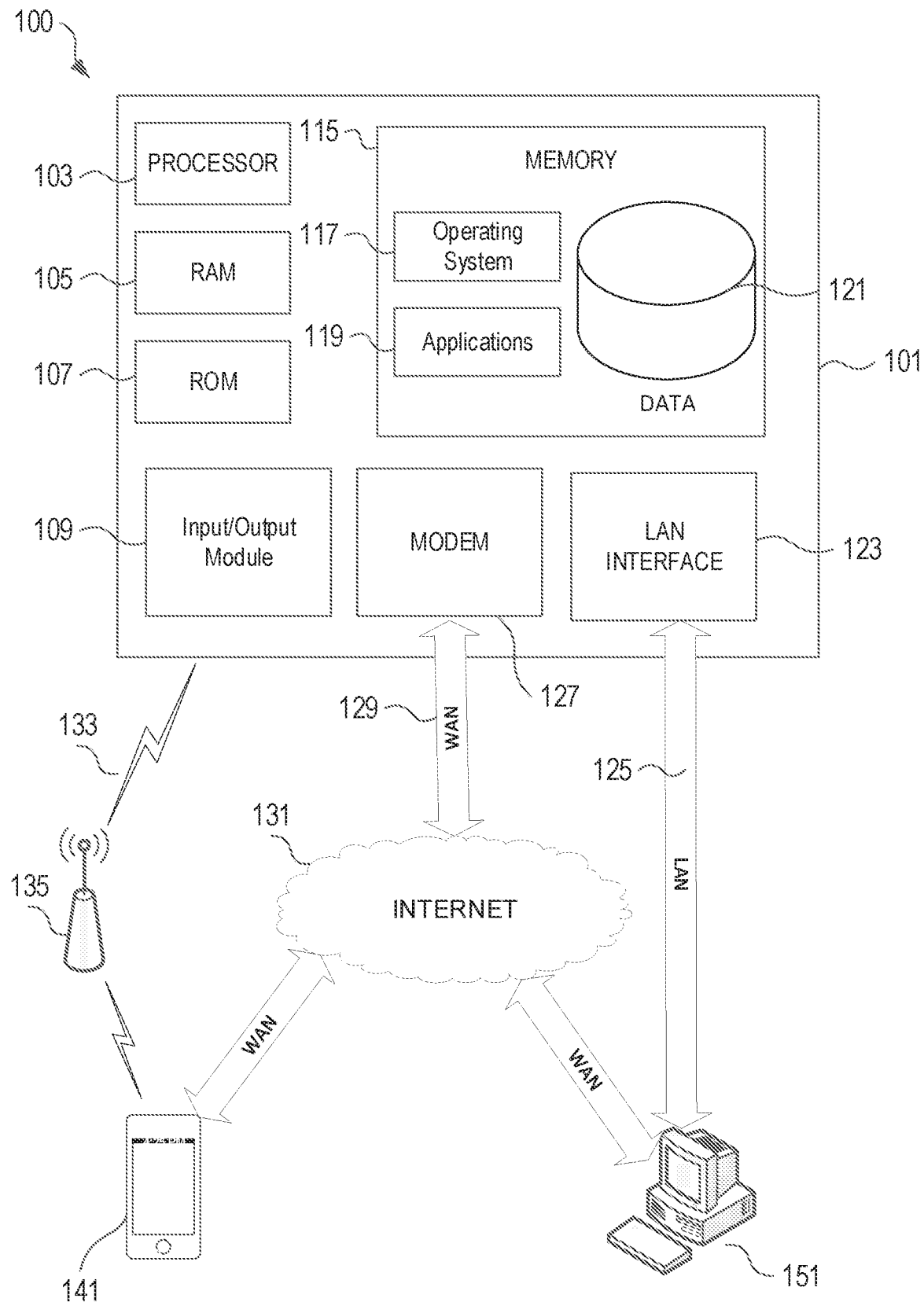
FIG. 1 illustrates a network environment and computing systems that may be used to implement aspects of the disclosure.

FIG. 1 illustrates a block diagram of a computing device 101 in real-time driver analysis communication system 100 that may be used according to one or more illustrative embodiments of the disclosure. The real-time driver analysis computing device 101 may have a processor 103 for controlling overall operation of the real-time driver analysis computing device 101 and its associated components, including RAM 105, ROM 107, input/output module 109, and memory unit 115. The real-time driver analysis computing device 101, along with one or more additional devices (e.g., terminals 141, 151) may correspond to any of multiple systems or devices, such as a real-time driver analysis computing devices or systems, configured as described herein for transmitting and receiving vehicle driver data, analyzing vehicle driver data, determining aspects related to a driver distraction level, and triggering distracted driving actions. Vehicle driver data can include data collected from vehicle sensors and OBD systems.

In an embodiment, a driver analysis computing device 101 may include a processor 103 and a memory unit 115 communicatively coupled to the processor 103 and storing machine-readable instructions. When executed by the processor 103, the machine-readable instructions may cause the processor 103 to receive driver sensor data from one or more driver sensors. The driver sensor data may be captured by the one or more driver sensors while a driver is driving a vehicle. The one or more driver sensors may monitor and record a plurality of conditions of the driver. The plurality of conditions may include at least movement of a body of the driver, movement of eyes of the driver, or combinations thereof. The processor 103 may analyze the driver sensor data to determine a distraction level of the driver. The processor 103 may compare the distraction level to a threshold. The processor 103 may determine, when the distraction level is above the threshold, that the driver is distracted. Responsive to a determination that the driver is distracted, the processor 103 may output, to a graphical user interface of a mobile computing device of the driver, one or more graphical warnings. Responsive to the determination that the driver is distracted, output, to a vehicle control computer of the vehicle, one or more control signals to the vehicle. The processor 103 may analyze the driver sensor data in real-time. The processor 103 may configure the one or more driver sensors to send the driver sensor data to the driver analysis computing device 101 in real-time. The one or more control signals may include instructions to activate brakes of the vehicle, control the vehicle autonomously, switch control of the vehicle from autonomous driving to manual driving, or combinations thereof. Autonomous control may be responsive to the determination that the driver is distracted and a determination that an autonomous driving mode is active. The processor 103 may further receive vehicle sensor data from one or more vehicle sensors indicative of operation of the vehicle, and analyze the vehicle sensor data and the driver sensor data to determine the distraction level of the driver.

Input/Output (I/O) 109 may include a microphone, keypad, touch screen, and/or stylus through which a user of the computing device 101 may provide input, and may also include one or more of a speaker for providing audio input/output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the real-time driver analysis system 101 to execute a series of computer-readable instructions to perform steps including transmitting and receiving vehicle driver data, analyzing vehicle driver data, determining aspects related to a driver distraction level, and triggering distracted driving actions.

The real-time driver analysis computing device 101 may operate in a networked environment 100 supporting connections to one or more remote computers, such as devices 141 and 151. Real-time driver analysis computing device 101, and related devices 141 and 151, may include devices installed in vehicles, mobile devices that may travel within vehicles, or devices outside of vehicles that are configured to receive and process vehicle driver data. Thus, the real-time driver analysis computing device 101 and devices 141 and 151 may each include personal computers (e.g., laptop, desktop, or tablet computers), servers (e.g., web servers, database servers), vehicle-based devices (e.g., specialized hardware devices for receiving and processing driver data, on-board vehicle computers, short-range vehicle communication systems, telematics devices), or mobile communication devices (e.g., mobile phones, portable computing devices, and the like), and may include some or all of the elements described above with respect to the real-time driver analysis computing device 101. The network connections depicted in FIG. 1 include a local area network (LAN) 125 and a wide area network (WAN) 129, and a wireless telecommunications network 133, but may also include other networks. When used in a LAN networking environment, the real-time driver analysis computing device 101 may be connected to the LAN 125 through a network interface or adapter 123. When used in a WAN networking environment, the real-time driver analysis computing device 101 may include a modem 127 or other means for establishing communications over the WAN 129, such as network 131 (e.g., the Internet). When used in a wireless telecommunications network 133, the real-time driver analysis computing device 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and real-time driver analysis system components described herein may be configured to communicate using any of these network protocols or technologies.

Additionally, one or more application programs 119 used by the real-time driver analysis computing device 101 may include computer executable instructions for transmitting and receiving vehicle driver data, analyzing vehicle driver data, determining aspects related to a driver distraction level, triggering distracted driving actions, and performing other related functions as described herein.

Figure 2:
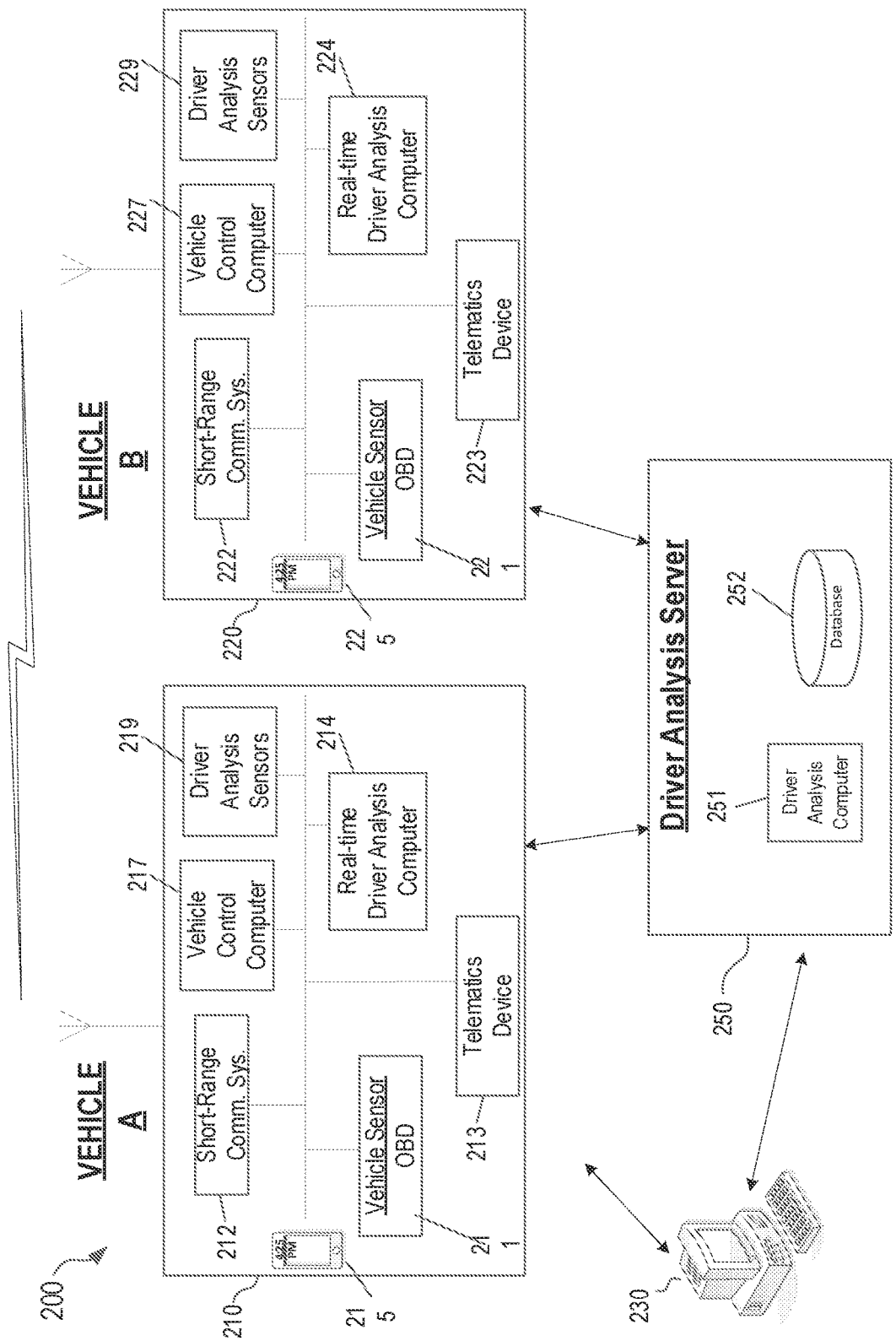
FIG. 2 is a diagram illustrating various example components of a distracted driving analysis system according to one or more aspects of the disclosure.

FIG. 2 is a diagram of an illustrative real-time driver analysis system 200 including two vehicles 210 and 220, a real-time driver analysis server 250, and additional related components. Each component shown in FIG. 2 may be implemented in hardware, software, or a combination of the two. Additionally, each component of the real-time driver analysis system 200 may include a computing device (or system) having some or all of the structural components described above for computing device 101.

Vehicles 210 and 220 in the real-time driver analysis system 200 may be, for example, automobiles (including autonomous and semi-autonomous vehicles), motorcycles, scooters, buses, recreational vehicles, boats, or other vehicles for which a vehicle driver data may be collected and analyzed. The vehicles 210 and 220 each include vehicle operation sensors 211 and 221 capable of detecting and recording various conditions at the vehicle and operational parameters of the vehicle. For example, sensors 211 and 221 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensors 211 and 221 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle OBD.

Additional sensors 211 and 221 may detect and store the external driving conditions, for example, external temperature, rain, snow, light levels, and sun position for driver visibility. For example, external cameras and proximity sensors 211 and 221 may detect other nearby vehicles, vehicle spacing, traffic levels, road conditions, traffic obstructions, animals, cyclists, pedestrians, and other conditions that may factor into a driving data analysis. Sensors 211 and 221 also may detect and store data relating to moving violations and the observance of traffic signals and signs by the vehicles 210 and 220. Additional sensors 211 and 221 may detect and store data relating to the maintenance of the vehicles 210 and 220, such as the engine status, oil level, engine coolant temperature, odometer reading, the level of fuel in the fuel tank, engine revolutions per minute (RPMs), software upgrades, and/or tire pressure.

Certain vehicle sensors 211 and 221 also may collect information regarding the driver's route choice, whether the driver follows a given route, and to classify the type of trip (e.g. commute, errand, new route, etc.). In certain embodiments, sensors and/or cameras 211 and 221 may determine when and how often the vehicles 210 and 220 stay in a single lane or stray into other lanes. A Global Positioning System (GPS), locational sensors positioned inside the vehicles 210 and 220, and/or locational sensors or devices external to the vehicles 210 and 220 may be used to determine the route, lane position, road-type (e.g. highway, entrance/exit ramp, residential area, etc.) and other vehicle position/location data.

The vehicles 210 and 220 may include driver analysis sensors 219 and 229 capable of monitoring and recording various conditions of the driver, such as the positions and/or movements of a driver's body, eyes, and the like. In one example, driver analysis sensors 219 and 229 may include one or more video cameras mounted throughout the vehicles 210 and 220, respectively.

The data collected by vehicle sensors 211 and 221 and/or driver analysis sensors 219 and 229 may be stored and/or analyzed within the respective vehicles 210 and 220, such as for example a real-time driver analysis computer 214, 224 integrated into the vehicle, and/or may be transmitted to one or more external devices. For example, as shown in FIG. 2, sensor data may be transmitted via short-range communication systems 212 and 222 to other nearby vehicles. Additionally, the sensor data may be transmitted via telematics devices 213 and 223 to one or more remote computing devices, such as real-time driver analysis server 250.

Short-range communication systems 212 and 222 are vehicle-based data transmission systems configured to transmit vehicle operational data to other nearby vehicles, and to receive vehicle operational data from other nearby vehicles. In some examples, communication systems 212 and 222 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems 212 and 222 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 212 and 222 may be sent via DSRC, Bluetooth, satellite, GSM infrared, IEEE 802.11, WiMAX, RFID, and/or any suitable wireless communication media, standards, and protocols. In certain systems, short-range communication systems 212 and 222 may include specialized hardware installed in vehicles 210 and 220 (e.g., transceivers, antennas, etc.), while in other examples the communication systems 212 and 222 may be implemented using existing vehicle hardware components (e.g., radio and satellite equipment, navigation computers) or may be implemented by software running on the mobile devices 215 and 225 of drivers and passengers within the vehicles 210 and 220.

The range of V2V communications between vehicle communication systems 212 and 222 may depend on the wireless communication standards and protocols used, the transmission/reception hardware (e.g., transceivers, power sources, antennas), and other factors. Short-range V2V communications may range from just a few feet to many miles, and different types of driving behaviors may be determined depending on the range of the V2V communications. For example, V2V communications ranging only a few feet may be sufficient for a real-time driver analysis computing device 101 in one vehicle to determine that another vehicle is tailgating or cut-off the vehicle, whereas longer communications may allow the device 101 to determine additional types of driving behaviors (e.g., vehicle spacing, yielding, defensive avoidance, proper response to a safety hazard, etc.) and driving conditions (e.g., congestion).

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. For example, a vehicle 210 may periodically broadcast (e.g., every 0.1 second, every 0.5 seconds, every second, every 5 seconds, etc.) certain vehicle operation data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle operation data to the other vehicles and/or devices.

As shown in FIG. 2, the data collected by vehicle sensors 211 and 221 and/or driver analysis sensors 219 and 229 also may be transmitted to a real-time driver analysis server 250, and one or more additional external servers and devices via telematics devices 213 and 223. Telematics devices 213 and 223 may be computing devices containing many or all of the hardware/software components as the real-time driver analysis computing device 101 depicted in FIG. 1. As discussed above, the telematics devices 213 and 223 may receive sensor data from sensors 211, 221, 219, and 229, and may transmit the data to one or more external computer systems (e.g., real-time driver analysis server 250 of an insurance company, financial institution, or other entity) over a wireless transmission network. Telematics devices 213 and 223 also may be configured to detect or determine additional types of data relating to real-time driving and the condition of the vehicles 210 and 220. In certain embodiments, the telematics devices 213 and 223 may contain or may be integral with one or more of the vehicle sensors 211 and 221 or system, such as an autonomous driving system. The telematics devices 213 and 223 also may store the type of their respective vehicles 210 and 220, for example, the make, model, trim (or sub-model), year, and/or engine specifications, autonomous driving system specifications, as well as other information such as vehicle owner or driver information, insurance information, and financing information for the vehicles 210 and 220.

In the example shown in FIG. 2, telematics devices 213 and 223 may receive vehicle driving data from vehicle sensors 211, 221, 219, and 229, and may transmit the data to a real-time driver analysis server 250. However, in other examples, one or more of the vehicle sensors 211 and 221 or systems, including autonomous driving systems, may be configured to receive and transmit data directly from or to a real-time driver analysis server 250 without using a telematics device. For instance, telematics devices 213 and 223 may be configured to receive and transmit data from certain vehicle sensors 211, 221, 219, and 229 or systems, while other sensors or systems may be configured to directly receive and/or transmit data to a real-time driver analysis server 250 without using the telematics devices 213 and 223. Thus, telematics devices 213 and 223 may be optional in certain embodiments.

In certain embodiments, vehicle sensors, vehicle OBD, autonomous driving systems, and/or vehicle communication systems, may collect and/or transmit data pertaining to autonomous or semi-autonomous driving of the vehicles. In autonomous driving, the vehicle fulfills all or part of the driving without being piloted by a human. An autonomous car can be also referred to as a driverless car, self-driving car, or robot car. For example, in autonomous driving, a vehicle control computer 217, 227 may be configured to operate all or some aspects of the vehicle driving, including but not limited to acceleration, braking, steering, and/or route navigation. A vehicle with an autonomous driving capability may sense its surroundings using the vehicle sensors 221, 221 and/or receive inputs regarding control of the vehicle from the vehicle communications systems, including but not limited to short range communication systems 212, 222, telematics devices, 213, 223, driver sensors 219, 229, and/or other vehicle communication systems.

In certain embodiments, mobile computing devices 215 and 225 within the vehicles 210 and 220 may be used to collect vehicle driving data and/or to receive vehicle driving data from vehicle communication systems and then to transmit the vehicle driving data to the real-time driver analysis server 250 and other external computing devices. Mobile computing devices 215 and 225 may be, for example, mobile phones, personal digital assistants (PDAs), or tablet computers of the drivers or passengers of vehicles 210, 220. Software applications executing on mobile devices 215, 225 may be configured to configure driver sensors 219 and 229, and detect certain driving data independently and/or may communicate with vehicle sensors 211, 221, driver sensors 219, 229, telematics devices 213, 223, autonomous driving systems, or other vehicle communication systems to receive additional driving data. For example, mobile devices 215, 225 equipped with GPS functionality may determine vehicle location, speed, direction and other basic driving data without needing to communicate with the vehicle sensors 211 or 221, or any vehicle system. In other examples, software on the mobile devices 215, 225 may be configured to receive some or all of the driving data collected by vehicle sensors 211, 221. Mobile computing devices 215 and 225 may also be involved with aspects of autonomous driving, including receiving, collecting, and transmitting vehicle operational data regarding autonomous driving and autonomous driving relationships between multiple vehicles.

When mobile computing devices 215 and 225 within the vehicles 210 and 220 are used to detect vehicle driving data and/or to receive vehicle driver data from sensors 219 and 229 and/or vehicle driving data from vehicle sensors 211 and 221, the mobile computing devices 215 and 225 may store, analyze, and/or transmit the vehicle driving data to one or more other devices. For example, mobile computing devices 215 and 225 may transmit vehicle driving data and/or vehicle driver data directly to one or more real-time driver analysis servers 250, and thus may be used in conjunction with or instead of telematics devices 213 and 223. Additionally, mobile computing devices 215 and 225 may be configured to perform the V2V communications described above, by establishing connections and transmitting/receiving vehicle driving data to and from other nearby vehicles. Thus, mobile computing devices 215 and 225 may be used in conjunction with, or instead of, short-range communication systems 212 and 222 in some examples. In addition, mobile computing devices 215 and 225 may be used in conjunction with the vehicle control computers 217 and 227 for purposes of autonomous driving. Moreover, the processing components of the mobile computing devices 215 and 225 may be used to perform steps including transmitting and receiving vehicle driver data, analyzing vehicle driver data, determining aspects related to a driver distraction level, triggering distracted driving actions, and performing other related functions as described herein. Therefore, in certain embodiments, mobile computing devices 215 and 225 may be used in conjunction with, or in place of, the real-time driver analysis computers 214 and 224.

Vehicles 210 and 220 may include real-time driver analysis computers 214 and 224, which may be separate computing devices or may be integrated into one or more other components within the vehicles 210 and 220, such as the short-range communication systems 212 and 222, telematics devices 213 and 223, autonomous driving systems, or the internal computing systems of vehicles 210 and 220. As discussed above, real-time driver analysis computers 214 and 224 also may be implemented by computing devices independent from the vehicles 210 and 220, such as mobile computing devices 215 and 225 of the drivers or passengers, or one or more separate computer systems 230 (e.g., a user's home or office computer). In any of these examples, the real-time driver analysis computers 214 and 224 may contain some or all of the hardware/software components as the real-time driver analysis computing device 101 depicted in FIG. 1. Further, in certain implementations, the functionality of the real-time driver analysis computers, such as transmitting and receiving vehicle driver data, analyzing vehicle driver data, determining aspects related to a driver distraction level, and triggering distracted driving actions, may be performed in a central real-time driver analysis server 250 rather than by individual vehicles 210 and 220. In such implementations, the vehicles 210 and 220 might only collect and transmit vehicle driving data to a real-time driver analysis server 250, and thus the vehicle-based real-time driver analysis computers 214 and 224 may be optional.

Real-time driver analysis computers 214 and 224 may be implemented in hardware and/or software configured to receive vehicle driving data from driver sensors 219 and 229, vehicle sensors 211 and 221, short-range communication systems 212 and 222, telematics devices 213 and 223, vehicle control computer 217 and 227, autonomous driving systems, and/or other driving data sources. Vehicle sensors/OBDs 211 and 221, short-range communication systems 212 and 222, telematics devices 213 and 223, vehicle control computer 217 and 227, autonomous driving systems, and/or other driving data sources can be referred to herein individually or collectively as a vehicle data acquiring component. The real-time driver analysis computer 214, 224 may comprise an electronic receiver to interface with the vehicle data acquiring components to receive the collected data. After receiving, via the electronic receiver, the vehicle driving data from, for example, a vehicle data acquiring component, the real-time driver analysis computers 214 and 224 may perform a set of functions including transmitting and receiving vehicle driver data, analyzing vehicle driver data, determining aspects related to a driver distraction level, and triggering distracted driving actions. Further descriptions and examples of the algorithms, functions, and analyses that may be executed by the real-time driver analysis computers 214 and 224 are described below, including in reference to FIG. 3.

The system 200 also may include a real-time driver analysis server 250, containing some or all of the hardware/software components as the computing device 101 depicted in FIG. 1. The real-time driver analysis server 250 may include hardware, software, and network components to receive vehicle driver data from one or more vehicles 210 and 220, and other data sources. The real-time driver analysis server 250 may include a driver database 252 and real-time driver analysis computer 251 to respectively store and analyze driver data received from vehicles and other data sources. The real-time driver analysis server 250 may initiate communication with and/or retrieve driver data from vehicles 210 and 220 wirelessly via telematics devices 213 and 223, mobile devices 215 and 225, or by way of separate computing systems (e.g., computer 230) over one or more computer networks (e.g., the Internet). Additionally, the real-time driver analysis server 250 may receive additional data from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., driver score, coverage amount, deductible amount, premium amount, insured status) for the vehicle, driver, and/or other nearby vehicles and drivers.

The real-time driver analysis computer 251 within the real-time driver analysis server 250 may be configured to retrieve driver data from the database 252, or may receive driving data directly from vehicles 210 and 220 or other data sources, and may perform functions including transmitting and receiving vehicle driver data, analyzing vehicle driver data, determining aspects related to a driver distraction level, triggering distracted driving actions, and adjusting insurance premiums based on the driver data. The functions performed by the real-time driver analysis computer 251 may be similar to those of real-time driver analysis computers 214 and 224, and further descriptions and examples of the algorithms, functions, and analyses that may be executed by the real-time driver analysis computer 251 are described below, including in reference to FIG. 3.

Figure 3:
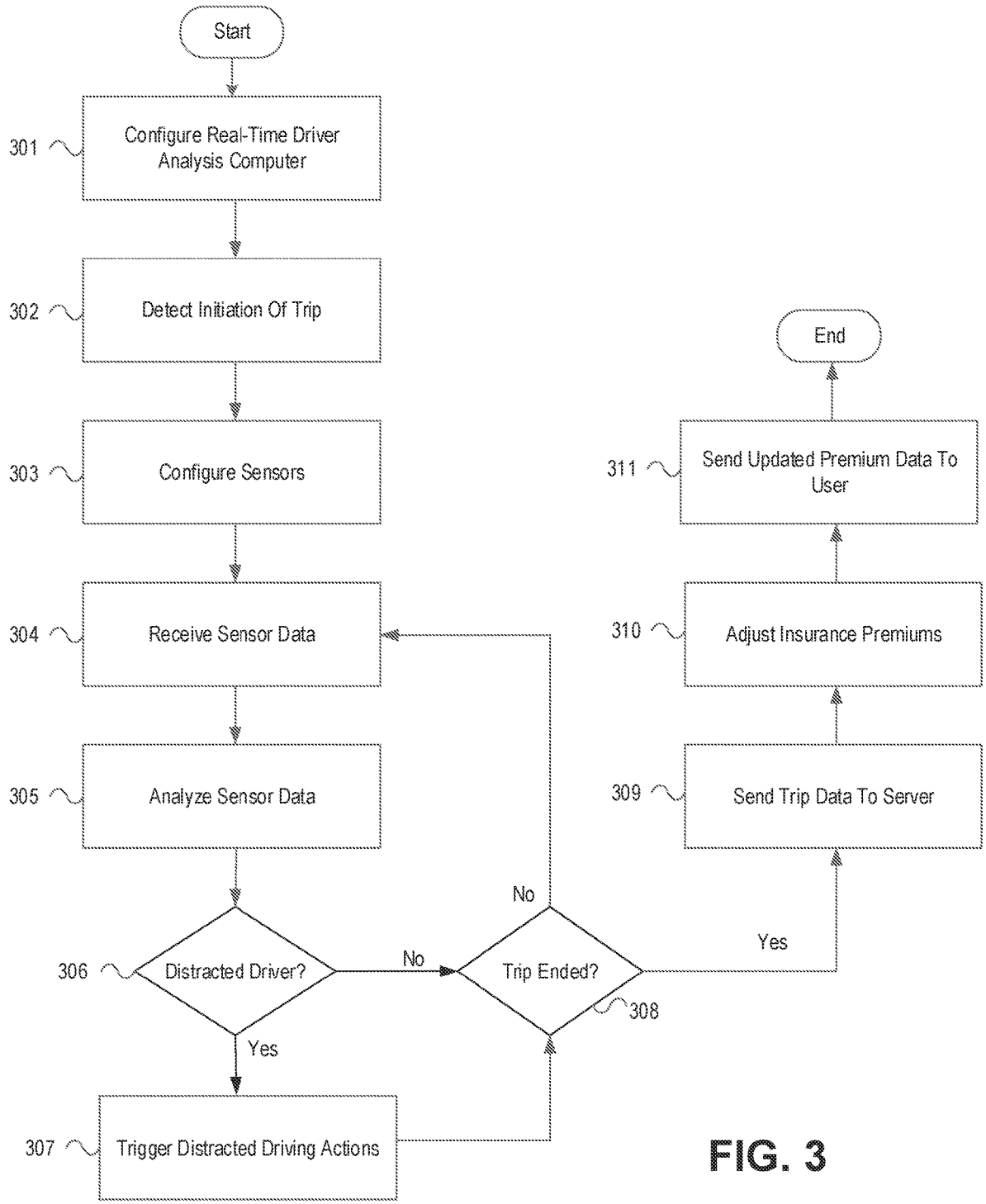
FIG. 3 is an example flow chart with steps which may be performed to perform distracted driving analysis in accordance with one or more aspects described herein.

FIG. 3 is an example flow chart with steps which may be performed to perform distracted driving analysis in accordance with one or more aspects described herein. The example of FIG. 3 may be performed by one or more computing devices in a real-time driver analysis system, such as vehicle-based real-time driver analysis computers 214 and 224, a driver analysis computer 251 of a driver analysis server 250, user mobile computing devices 215 and 225, and/or other computer systems.

In step 301, the real-time driver analysis computer 214 may be configured. The configuration of the real-time driver analysis computer 214 may be based on one or more user preferences. For example, the user may provide the user preferences using a graphical interface output by the real-time driver analysis computer 214. The graphical interface may additionally or alternatively be output by the mobile device 215 or the driver analysis computer 251 of driver analysis server 250. Using the graphical interface, the user may activate or deactivate one or more of driver analysis sensors 219. The processor 103 of the real-time driver analysis computer 214 (or of the computing device 101 described above) may be configured to receive user preferences, activate a first sensor of the one or more driver sensors based on the user preferences, the first sensor configured to monitor movement of one of the body or the eyes of the driver, and de-activate a second sensor of the one or more driver sensors based on the user preferences, the second sensor configured to monitor movement of the other of the body or the eyes of the driver. For example, the user may activate the eye sensors but deactivate the body sensors. The processor 103 may be configured to receive user preferences comprising one or more time period preferences for monitoring the driver, and cause the one or more driver sensors to monitor the driver during the one or more time period preferences. The user may specify when and/or where the real-time driver analysis computer 214 is to monitor the driver. For example, the user may only want to be monitored at specific times of the day, certain days of the week, certain locations, driving routes, and the like. The user may also specify how often the sensor data is to be sent by the real-time driver analysis computer 214 to the driver analysis computer 251 of driver analysis server 250. Alternatively, these settings may be configured by a third party entity, such as an insurance company, using a computing device in communication with the real-time driver analysis computer 214, such as driver analysis computer 251 of driver analysis server 250.

If a driver is using the real-time driver analysis computer 214 for the first time, configuration of the real-time driver analysis computer 214 may also include configuring the baseline (e.g., threshold) position/movement data of a driver. Different drivers may share a single vehicle. In order to differentiate between the different drivers, the real-time driver analysis computer 214 may collect an initial set of driver data. For example, the drivers may provide the real-time driver analysis computer 214 with one or more images of themselves. The processor 103 may be configured to receive a baseline image of the driver, perform a comparison of an image of the driver received from the one or more driver sensors to the baseline image, identify the driver based on the comparison, and determine the distraction level of the driver based on the comparison. The image may be pre-existing, or may be taken using driver analysis sensors 219 (such as a camera). The user may also provide, along with the image, identification data to the real-time driver analysis computer 214. Thus, the real-time driver analysis computer 214 may then associate the image with the particular driver. During subsequent uses of the real-time driver analysis computer 214 by a particular driver, configuration of the real-time driver analysis computer 214 at step 301 may simply require identification of the driver using a real-time image and a pre-stored image. That is, when a driver begins driving the vehicle, the real-time driver analysis computer 214 may use driver analysis sensors 219 to capture an image of the driver, and may then compare this image with its pre-stored images to identify the particular driver.

At step 302, the real-time driver analysis system may detect that a trip is beginning. In one example, the real-time driver analysis computer 214 may detect that the trip is beginning. This may be done by the user providing an input to the real-time driver analysis computer 214 (for example, via a display screen of the real-time driver analysis computer 214) indicating that the user is beginning a trip. Additionally, or alternatively, the real-time driver analysis computer 214 may determine that the trip has begun based on data received from driver analysis sensors 219. That is, the real-time driver analysis computer 214 may determine, based on a position or movement of the driver (for example, the position and/or movement of the driver's eyes, head, arms, hands, and the like) that the driver has begun driving. Additionally, or alternatively, the mobile device 215 may determine that the driver has begun driving (for example, via GPS, its accelerometer, or user inputs) and send a notification to the real-time driver analysis computer 214 indicating that the trip has begun.

At step 303, the real-time driver analysis computer 214 may configure the driver analysis sensors 219. Configuration of the sensors may include activating the driver analysis sensors 219 and configuring the transmission of data from the driver analysis sensors 219 to the real-time driver analysis computer 214. For example, the real-time driver analysis computer 214 may configure the sensors to stream the captured data to the real-time driver analysis computer 214, or to send the captured data at regular intervals (every second, every 1/10 second, etc.). The intervals may be determined based on user input, input from the driver analysis computer 251 of driver analysis server 250, or based on default values.

At step 304, the real-time driver analysis computer 214 may begin receiving data captured by the driver analysis sensors 219 during the trip. As stated above, the captured data may be streamed from the driver analysis sensors 219 to the real-time driver analysis computer 214 in real-time, or sent during pre-determined time intervals.

At step 305, the real-time driver analysis computer 214 may analyze, in real-time, the captured data received from the driver analysis sensors 219. The captured data may include images and/or video data. Thus, the driver sensor data may include video data. The real-time driver analysis computer 214 may analyze the captured data to determine a distraction level of the driver. For example, the real-time driver analysis computer 214 may compare the eye position and/or movement from the captured data against baseline eye position/movement data for the driver. The baseline data may be stored locally within the real-time driver analysis computer 214 or may be retrieved from the mobile device 215 and/or the driver analysis computer 251 of driver analysis server 250. The result of the comparison may be used to the determine the distraction level of the driver. For example, the baseline data for a driver may indicate the position of the driver's eyes when the driver is driving without any distractions. If the comparison of the captured data and the baseline data indicates that the eyes of the driver are now positioned downward, the real-time driver analysis computer 214 may determine that the driver is distracted. In another example, the baseline data may indicate the approximate frequency at which the driver blinks. If the comparison indicates that the there is a deviation from this frequency (e.g., the driver has fallen asleep or is otherwise impaired), the real-time driver analysis computer 214 may determine that the distraction level of the driver is high. In another example, the real-time driver analysis computer 214 may compare the baseline body movements of the driver with the captured data. The distraction level of the driver may include and/or be indicative of a type of distraction. Such a comparison may be useful in determining if the driver is about to fall asleep, the driver is about to have a seizure, the driving is losing consciousness, the driver is impaired, or the like type of distraction. The distraction level may be calculated based on a deviation of the captured data from the baseline data for the driver.

At step 306, the real-time driver analysis computer 214 may determine if the driver is distracted. The determination may be based on comparing the distraction level of the driver to one or more threshold values. The threshold values may be set by the user (via the mobile device 215 or the real-time driver analysis computer 214) or by a third party entity (via the driver analysis computer 251 of driver analysis server 250).

If the driver is distracted, then at step 307, one or more distractive driving actions may be triggered. The real-time driver analysis computer 214 may determine which distracted driving actions to trigger based on preferences set by the user or a third party entity. Distracted driving actions may include outputting alerts on the real-time driver analysis computer 214 and/or the mobile device 215. Additionally, or alternatively, the distracted driving actions may include sending control signals to the vehicle control computer 217. The type of alert, as well as the location of the alert may be pre-configured by the driver using any of the mobile device 215, real-time driver analysis computer 214, or driver analysis computer 251 of driver analysis server 250. For example, the driver may prefer that if the real-time driver analysis computer 214 detects that the driver is distracted, the real-time driver analysis computer 214 output audio, visual, and/or tactile alerts on the real-time driver analysis computer 214. Alternatively, or additionally, the driver may configure the real-time driver analysis computer 214 to send any alerts to the mobile device 215. The driver may pre-configure how long the alerts are to displayed for, the contents of the alerts, the frequency of the alerts, and the like. The driver may provide different alert configurations for different distraction levels. The processor 103 may be configured to receive user preferences associating a plurality of alert configurations with a plurality of driver distraction levels, determine an alert configuration from among the plurality of alert configurations associated with the determined distraction level based on the user preferences, and output the determined alert configuration, wherein the determined alert configuration comprises an output to the graphical user interface of the mobile computing device of the driver, an output of the one or more control signals to the vehicle, or combinations thereof. For example, the driver may configure real-time driver analysis computer 214 such that if the driver is at a first distraction level, a particular type of alert (audio, visual, tactile) is to be output to a particular device (mobile device 215, real-time driver analysis computer 214) for a particular period of time (5 seconds). The driver may then set different configurations for a second distraction level, third distraction level, and so on. Alternatively, or additionally, the driver may set different configurations for different types of distractions. For example, the user may configure the real-time driver analysis computer 214 to use a first set of alert settings (type, device, time) if the real-time driver analysis computer 214 determines that the user has fallen asleep. The user may also configure the real-time driver analysis computer 214 to use a second set of alert settings if the real-time driver analysis computer 214 determines that the driver is having a seizure. These configurations may be made by the user using a graphical user interface provided on a display screen of the real-time driver analysis computer 214. Alternatively, or additionally, the user may utilize a graphical user interface output on the mobile device 215 to configure the real-time driver analysis computer 214, and the mobile device 215 may then provide the configurations to the real-time driver analysis computer 214. In yet another example, the user may utilize a graphical user interface provided by the driver analysis computer 251 of driver analysis server 250 to configure the real-time driver analysis computer 214, and the driver analysis computer 251 of driver analysis server 250 may then provide the driver's configuration settings to the real-time driver analysis computer 214.

As noted above, the distracted driving actions may include control signals sent by the real-time driver analysis computer 214 to the vehicle control computer 217. These types of distracted driving actions may allow the real-time driver analysis computer 214 to control an autonomous or semi-autonomous vehicle if the real-time driver analysis computer 214 determines that the driver of the vehicle is distracted. The control signals may be used to apply brakes, turn on the hazard lights, stop the car, pull the car over to the side of the road, control the vehicle autonomously, switch control of the vehicle from autonomous driving to manual driving, and the like. As with the alerts, the user may pre-configure which control signals are to be sent to the vehicle control computer 217 based on the distraction level of the user. For example, the driver may configure real-time driver analysis computer 214 such that if the driver is at a first distraction level, a particular type of control signal (activation of the hazard lights) is to be sent to the vehicle control computer 217. The driver may then set different configurations for a second distraction level, third distraction level, and so on. Alternatively, or additionally, the driver may set different configurations for different types of distractions. For example, the user may configure the real-time driver analysis computer 214 to send a first control signal (e.g., control signal to apply the brakes) to the vehicle control computer 217 if the real-time driver analysis computer 214 determines that the user has fallen asleep. The user may also configure the real-time driver analysis computer 214 to send a second control signal (e.g., control signal to apply the brakes and to navigate the vehicle to the side of the road) to the vehicle control computer 217 if the real-time driver analysis computer 214 determines that the driver is having a seizure. These configurations may be made by the user using a graphical user interface provided on a display screen of the real-time driver analysis computer 214. Alternatively, or additionally, the user may utilize a graphical user interface output on the mobile device 215 to configure the real-time driver analysis computer 214, and the mobile device 215 may then provide the configurations to the real-time driver analysis computer 214. In yet another example, the user may utilize a graphical user interface provided by the driver analysis computer 251 of driver analysis server 250 to configure the real-time driver analysis computer 214, and the driver analysis computer 251 of driver analysis server 250 may then provide the driver's configuration settings to the real-time driver analysis computer 214.

If, at step 306, the real-time driver analysis computer 214 determines that the driver is not distracted, and/or after the real-time driver analysis computer 214 triggers the appropriate distracted driving actions at step 307, the real-time driver analysis computer 214 may determine, at step 308, if the trip has ended. The real-time driver analysis computer 214 may make such a determination based on user inputs indicating that the trip has ended (at the mobile device 215 and/or the real-time driver analysis computer 214). Alternatively, or additionally, the real-time driver analysis computer 214 may make such a determination based on data received from the driver analysis sensors 219 (e.g., the video/images from the driver analysis sensors 219 indicate that the driver is no longer in the car or is otherwise occupied). Alternatively, or additionally, the real-time driver analysis computer 214 may receive a notification from the mobile device 215 indicating that the trip has ended.

If the real-time driver analysis computer 214 determines that the trip has not ended, processing may return to step 304, where the real-time driver analysis computer 214 may continue to receive and analyze additional real-time data captured by the driver analysis sensors 219. If the real-time driver analysis computer 214 determines that the trip has ended, then at step 309, the real-time driver analysis computer 214 may send the trip data to the driver analysis computer 251 of driver analysis server 250. The real-time driver analysis computer 214 may send the trip data to the driver analysis computer 251 of driver analysis server 250 either directly or via the mobile device 215. The trip data may include the results of the real-time analysis performed by the real-time driver analysis computer 214 using the real-time data captured and sent by the driver analysis sensors 219. For example, the trip data may include the distraction level(s) of the driver at a plurality of time steps during the trip, and any other relevant data captured by the real-time driver analysis computer 214 (e.g., video evidencing that the driver fell asleep during the trip).

At step 310, the driver analysis computer 251 of driver analysis server 250 may make adjustments to a driver's insurance premium based on the trip data received from the real-time driver analysis computer 214. Thus, the processor 103 may be configured to determine trip data comprising the distraction level of the driver at a plurality of time steps during a driving trip, and update an insurance premium of the driver based on the trip data. The driver analysis computer 251 of driver analysis server 250 may compare the trip data received from the real-time driver analysis computer 214 to historical trip data for the driver stored in the database 252 to determine the adjustment to be made. For example, if the comparison indicates a downward trend in the driver's distraction level, the insurance premium of the driver may be reduced, but if the comparison indicates an upward trend in the driver's distraction level, an upward adjustment to the driver's insurance premium may be made.

At step 311, the driver analysis computer 251 of driver analysis server 250 may send, to the mobile device 215 of the drive, updated information on the driver's insurance premium. The insurance may include the new insurance premium, the adjustment amount, and a description of why the adjustment was made.

Figure 4:
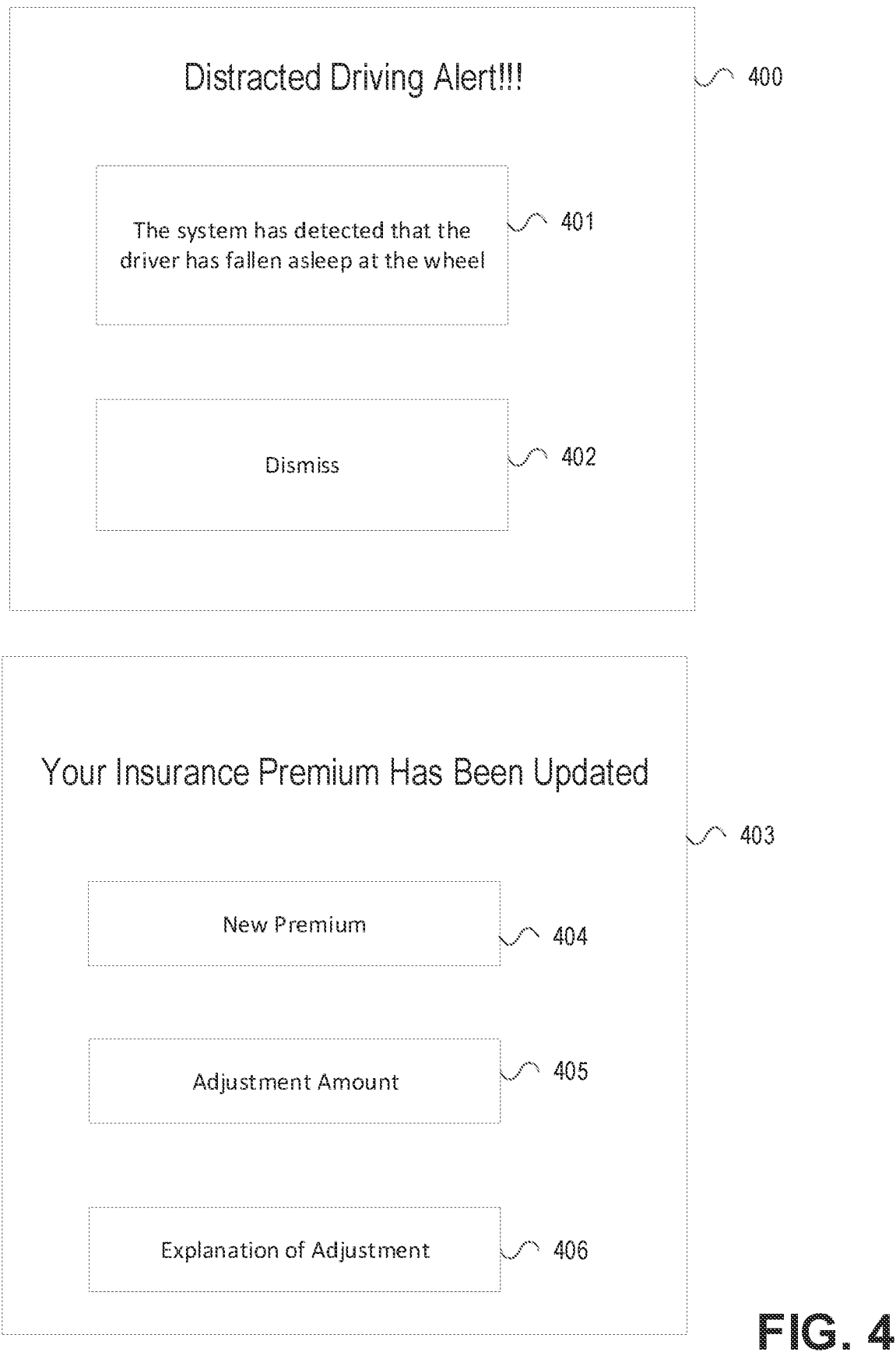
FIG. 4 depicts graphical user interfaces that may be presented on a display device in accordance with one or more aspects described herein.

FIG. 4 depicts two graphical user interfaces that may be presented on a display device in accordance with one or more aspects described herein. Graphical user interface 400 may be displayed when the real-time driver analysis computer 214 determines that the driver is distracted. The graphical user interface 400 may be displayed on a display screen of the mobile device 215 or the real-time driver analysis computer 214. Element 401 of the graphical user interface 400 may indicate the distraction determination made by the real-time driver analysis computer 214. If the user selects element 401, additional information may be provided to the user (for example, the videos captured by the driver analysis sensors 219 evidencing the driver's distracted driving). If the user selects element 402, the warning may be dismissed and closed. Graphical user interface 403 may be displayed when the driver analysis computer 251 of driver analysis server 250 has updated an insurance premium of the user. Graphical user interface 403 may be presented on the mobile device 215. Element 404 may display the new insurance premium amount of the user. Element 405 may display the adjustment different between the previous insurance premium and the current insurance premium. Element 406 may include an explanation of why the insurance premium of the user was adjusted. If the user selects element 406, additional information may be provided to the user (for example, the videos captured by the driver analysis sensors 219 evidencing the driver's distracted driving).

Embodiments disclosed herein improve a driver analysis computing device and/or communicatively coupled vehicle controllers, such as by analyzing driver data in real-time, detecting distracted driving, and triggering distracted driving actions upon detection of distracted driving to improve the associated computer technology via at least accelerated processing and/or response times. As such, the devices, systems, and methods disclosed herein include increased efficiencies and have improved response times compared to other current driver analysis devices and/or vehicle controllers.

While the aspects described herein have been discussed with respect to specific examples including various modes of carrying out aspects of the disclosure, those skilled in the art will appreciate that there are numerous variations and permutations of the above described systems and techniques that fall within the spirit and scope of the disclosure. In addition, where reference has been made in this disclosure to items in the figures, in some instances the alphabetic suffix (e.g., "A" or "B") of a reference number has been omitted when it is desired to generally reference (e.g., "226") the item without specificity as to which of the plurality of items corresponding to the same base reference number.

What is claimed is:

1. A driver analysis computing device comprising:
   a processor; and
   a memory unit communicatively coupled to the processor and storing machine-readable instructions,
   wherein, when executed by the processor, the machine-readable instructions stored in the memory unit, cause the processor to:
   receive user preferences;
   activate a first sensor of one or more driver sensors based on the user preferences, the first sensor configured to monitor movement of one of a body or eyes of a driver of a vehicle;
   de-activate a second sensor of the one or more driver sensors based on the user preferences, the second sensor configured to monitor movement of the other of the body or the eyes of the driver;
   receive driver sensor data from the one or more driver sensors, wherein the driver sensor data is captured by the one or more driver sensors while the driver is driving the vehicle, the one or more driver sensors configured to monitor and record a plurality of conditions of the driver, the plurality of conditions comprising at least movement of the body of the driver, movement of the eyes of the driver, or combinations thereof;
   analyze the driver sensor data to determine a distraction level of the driver;
   compare the distraction level to a threshold;
   determine, when the distraction level is above the threshold, that the driver is distracted;

responsive to a determination that the driver is distracted, output, to a graphical user interface of a mobile computing device of the driver, one or more graphical warnings; and responsive to the determination that the driver is distracted, output, to a vehicle control computer of the vehicle, one or more control signals to the vehicle.

2. The driver analysis computing device of claim 1, wherein the machine-readable instructions further cause the processor to analyze the driver sensor data in real-time.

3. The driver analysis computing device of claim 1, wherein the machine-readable instructions further cause the processor to configure the one or more driver sensors to send the driver sensor data to the driver analysis computing device in real-time.

4. The driver analysis computing device of claim 1, wherein the one or more control signals comprise instructions to activate brakes of the vehicle, control the vehicle autonomously, switch control of the vehicle from autonomous driving to manual driving, or combinations thereof.

5. The driver analysis computing device of claim 1, wherein the machine-readable instructions further cause the processor receive vehicle sensor data from one or more vehicle sensors indicative of operation of the vehicle, and analyze the vehicle sensor data and the driver sensor data to determine the distraction level of the driver.

6. The driver analysis computing device of claim 1, wherein the driver sensor data comprises video data.

7. The driver analysis computing device of claim 1, wherein the distraction level of the driver comprises a type of distraction.

8. The driver analysis computing device of claim 7, wherein the type of distraction comprises an indication of the driver falling asleep, the driving losing consciousness, or the driver having a seizure.

9. The driver analysis computing device of claim 1, wherein the machine-readable instructions further cause the processor to:
receive the user preferences comprising one or more time period preferences for monitoring the driver; and
cause the one or more driver sensors to monitor the driver during the one or more time period preferences.

10. The driver analysis computing device of claim 1, wherein the machine-readable instructions further cause the processor to:
receive a baseline image of the driver;
perform a comparison of an image of the driver received from the one or more driver sensors to the baseline image;
identify the driver based on the comparison; and determine the distraction level of the driver based on the comparison.

11. The driver analysis computing device of claim 1, wherein the machine-readable instructions further cause the processor to:
receive the user preferences associating a plurality of alert configurations with a plurality of driver distraction levels;
determine an alert configuration from among the plurality of alert configurations associated with the determined distraction level based on the user preferences; and
output the determined alert configuration, wherein the determined alert configuration comprises an output to the graphical user interface of the mobile computing device of the driver, an output of the one or more control signals to the vehicle, or combinations thereof.

12. The driver analysis computing device of claim 1, wherein the machine-readable instructions further cause the processor to:
determine trip data comprising the distraction level of the driver at a plurality of time steps during a driving trip; and
update an insurance premium of the driver based on the trip data.

13. A computer-implemented method comprising:
receiving user preferences;
activating a first sensor of one or more driver sensors based on the user preferences, the first sensor configured to monitor movement of one of a body or eyes of a driver of a vehicle;
de-activating a second sensor of the one or more driver sensors based on the user preferences, the second sensor configured to monitor movement of the other of the body or the eyes of the driver;
receiving driver sensor data from the one or more driver sensors, wherein the driver sensor data is captured by the one or more driver sensors while the driver is driving the vehicle, the one or more driver sensors configured to monitor and record a plurality of the body of the driver, movement of the eyes of the driver, or combinations thereof;
analyzing the driver sensor data to determine a distraction level of the driver;
comparing the distraction level to a threshold;
determining, when the distraction level is above the threshold, that the driver is distracted;
responsive to a determination that the driver is distracted, outputting, to a graphical user interface of a mobile computing device of the driver, one or more graphical warnings; and
responsive to the determination that the driver is distracted, outputting, to a vehicle control computer of the vehicle, one or more control signals to the vehicle.

14. The method of claim 13, wherein the one or more control signals comprise instructions to activate brakes of the vehicle.

15. The method of claim 13, wherein the one or more control signals comprise instructions to control the vehicle autonomously in response to the determination that the driver is distracted and a determination that an autonomous driving mode is active.

16. The method of claim 13, the distraction level of the driver comprises a type of distraction, and the type of distraction comprises an indication of the driver falling asleep or the driver having a seizure.

17. The method of claim 13, further comprising:
receiving a baseline image of the driver;
performing a comparison of an image of the driver received from the one or more driver sensors to the baseline image; and
determining the distraction level of the driver based on the comparison.

18. A computer-implemented method comprising:
receiving user references;
activating a first sensor of one or more driver sensors based on the user preferences, the first sensor configured to monitor movement of one of a body or eyes of a driver of a vehicle;
de-activating a second sensor of the one or more driver sensors based on the user preferences the second sensor configured to monitor movement of the other of the body or the eyes of the driver;

receiving vehicle sensor data from one or more vehicle sensors indicative of operation of the vehicle;

receiving driver sensor data from one or more driver sensors, wherein the driver sensor data is captured by the one or more driver sensors while the driver is driving the vehicle, the one or more driver sensors configured to monitor and record a plurality of conditions of the driver, the plurality of conditions comprising at least movement of the body of the driver, movement of the eyes of the driver, or combinations thereof;

analyzing the driver sensor data and the vehicle sensor data to determine a distraction level of the driver in real-time;

comparing the distraction level to a threshold;

determining, when the distraction level is above the threshold, that the driver is distracted;

responsive to a determination that the driver is distracted, outputting, to a graphical user interface of a mobile computing device of the driver, one or more graphical warnings; and responsive to the determination that the driver is distracted, outputting, to a vehicle control computer of the vehicle, one or more control signals to the vehicle.

* * * * *